US012623154B2

(12) United States Patent
Kim et al.

(10) Patent No.: US 12,623,154 B2
(45) Date of Patent: May 12, 2026

(54) SYSTEM FOR RECOGNIZING PLAYER BEHAVIOR AND GAME SITUATION IN SPORTS GAME VIDEO

(71) Applicant: KOREA INSTITUTE OF SCIENCE AND TECHNOLOGY, Seoul (KR)

(72) Inventors: Jinwook Kim, Seoul (KR); Seong Geun Yoo, Seoul (KR); Kyung-Ryoul Mun, Seoul (KR); Donghoon Kang, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 705 days.

(21) Appl. No.: 18/087,170

(22) Filed: Dec. 22, 2022

(65) Prior Publication Data

US 2024/0001242 A1     Jan. 4, 2024

(30) Foreign Application Priority Data

Jul. 4, 2022     (KR) ........................ 10-2022-0081685

(51) Int. Cl.
*A63F 13/67*          (2014.01)
*A63F 13/812*          (2014.01)
(52) U.S. Cl.
CPC ............. *A63F 13/67* (2014.09); *A63F 13/812* (2014.09)
(58) Field of Classification Search
CPC .... A63F 13/812; G06V 10/764; G06V 20/49; G06V 20/70; G06V 20/42
See application file for complete search history.

(56) References Cited

U.S. PATENT DOCUMENTS 11,900,682 B2 *     2/2024     Hu ............................ G06N 3/08
2018/0132011 A1 *     5/2018     Shichman ............. H04N 21/233
2021/0397847 A1 *     12/2021     Jayaram ........... H04N 21/21805
(Continued)

FOREIGN PATENT DOCUMENTS

KR     10-2002-0078707 A     10/2002
KR     10-2008-0097403 A     11/2008
KR     10-2018-0063777 A     6/2018
(Continued)

OTHER PUBLICATIONS

Korean Office Action issued on Dec. 13, 2024, in counterpart Korean Patent Application No. 10-2022-0081685 (9 pages in English, 6 pages in Korean).

*Primary Examiner* — John R Wallace
(74) *Attorney, Agent, or Firm* — NSIP Law

(57) ABSTRACT

Provided is a system for recognizing a player behavior and a game situation in a sports game video. The system for recognizing a player behavior and a game situation in a sports game video according to an embodiment includes at least one processor and a memory configured to store a program that is executed by the at least one processor, wherein the processor is configured to generate a video clip by extracting a game video every predetermined time, generate a game situation information by analyzing the video clip through a trained analysis model, and generate a game situation service information through the game situation information and provide the game situation service information to a user, and wherein the game video is a video of a sport game being played between a first team and a second team on a court.

3 Claims, 1 Drawing Sheet

10

(56) References Cited

U.S. PATENT DOCUMENTS

| | | | | |
|---|---|---|---|---|
| 2022/0327830 A1* | 10/2022 | Chang | .................... | G06V 30/19 |
| 2023/0072888 A1 | 3/2023 | Kim | | |

FOREIGN PATENT DOCUMENTS

| | | |
|---|---|---|
| KR | 10-2107055 B1 | 5/2020 |
| KR | 10-2020-0061747 A | 6/2020 |
| KR | 10-2021-0081118 A | 7/2021 |
| KR | 10-2021-0151232 A | 12/2021 |
| KR | 10-2378738 B1 | 3/2022 |
| WO | WO 2007/070049 A1 | 6/2007 |

* cited by examiner

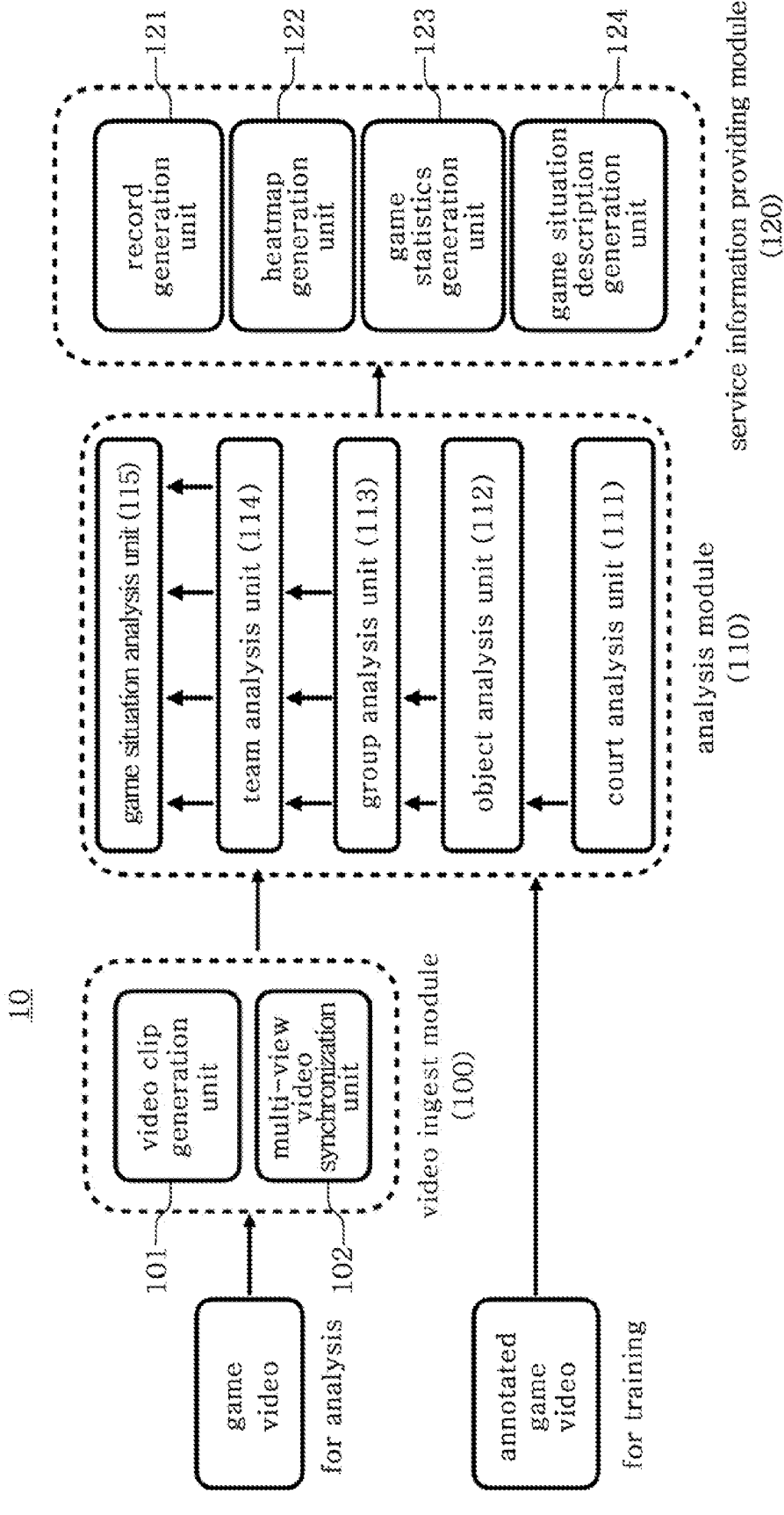

SYSTEM FOR RECOGNIZING PLAYER BEHAVIOR AND GAME SITUATION IN SPORTS GAME VIDEO

DESCRIPTION OF GOVERNMENT-FUNDED RESEARCH AND DEVELOPMENT

This research is conducted under the support of Ministry of Culture, Sports and Tourism, Building Innovation Infrastructure in Sports Industry (R&D), [Project Name: Data management in training games of players and AI based athletic performance improvement solution technology development, Project Number: 1375027374, Project Serial Number: S202101-07-08].

CROSS-REFERENCE TO RELATED APPLICATION

This application claims priority to Korean Patent Application No. 10-2022-0081685, filed on Jul. 4, 2022, and all the benefits accruing therefrom under 35 U.S.C. § 119, the contents of which in its entirety are herein incorporated by reference.

BACKGROUND

1. Field

The present disclosure relates to a system for recognizing a player behavior and a game situation in a sports game video, and more particularly, to a system which recognizes the behaviors of individual players and teams in a game, recognizes a more complicated game situation and provides to a user.

2. Description of the Related Art

Video based activity classification and recognition is necessary in various industrial applications. The video based activity recognition has used the traditional method including extracting a human region in a video, extracting the features of the extracted human, and training a classifier with the calculated feature values to recognize activities. Additionally, methods which extract a human pose, and train features based on the pose to recognize activities have been devised. Recently, attention is directed to end-to-end activity recognition by training activity labels in videos using a deep learning model such as convolutional neural network (CNN) and long short-term memory (LSTM).

However, the proposed methods have been greatly developed in the task of recognizing simple activities such as walking and running for a uniform length of time, but in sports games with game rules and teams, they are not suitable to recognize a game situation made up of complex activities by hierarchically recognizing many simple activities.

Accordingly, the present disclosure proposes a system and device for recognizing the behaviors of individual players and teams in a game and recognizing a more complex game situation.

SUMMARY

The present disclosure is designed to solve the above-described problem, and specifically, the present disclosure is directed to providing a system for recognizing a player behavior and a game situation in a sports game video in which in a sports game with game rules and teams, the system recognizes a game situation made up of complex activities by hierarchically recognize many simple activities, analyzes the behaviors of individual players and teams and the game situation together and provides the analysis results to a user.

A system for recognizing a player behavior and a game situation in a sports game video includes at least one processor and a memory configured to store a program that is executed by the at least one processor, wherein the processor is configured to generate a video clip by extracting a game video every predetermined time, generate game situation information by analyzing the video clip through a trained analysis model, and generate a game situation service information through the game situation information and provide the game situation service information to a user, and the game video is a video of a sport game being played between a first team and a second team on a court.

The game video may be a multi-view video including a plurality of game sub videos of the sports game recorded at a plurality of different angles, and the processor may be further configured to synchronize the plurality of game sub videos on a time axis, and extract the video clip every predetermined time in each of the plurality of synchronized game sub videos.

The processor may be further configured to generate court recognition information by recognizing a court area by analyzing the game video using semantic segmentation, generate an object information by recognizing players and referees participating in the game in the recognized court area and equipment used in the game, generate group information by recognizing a behavior of a group by inputting the court recognition information and the object information to a first prediction model, generate team information by recognizing the first team and the second team based on the group information, and generate the game situation information by inputting the court recognition information, the object information, the team information and the group information to a second prediction model, the first prediction model may be pre-trained with a pre-annotated label by encoding the court recognition information and the object information and extracting a specific vector, and the second prediction model may be pre-built by training with a game situation information label by encoding the court recognition information, the object information, the team information and the group information and extracting a specific vector.

The processor may be further configured to record events occurring in the game and generate in a suitable form for game broadcasting, generate a heatmap by accumulating accumulated locations of the players and a ball possession situation, generate game statistics, and automatically generate situation information in a text form for use in game commentary based on the recognition of the game video.

The system for recognizing a player behavior and a game situation in a sports game video according to an embodiment of the present disclosure may recognize the complex game situation and the players' situations to generate service information and provide the service information to various users who are needed to broadcast the game. Accordingly, it is possible to assist or replace the existing sports broadcasting, and reduce referee mistakes.

The system for recognizing a player behavior and a game situation in a sports game video according to an embodiment of the present disclosure can be used in various types of sports games.

BRIEF DESCRIPTION OF THE DRAWINGS

FIGURE shows the architecture of a system for recognizing a player behavior and a game situation in a sport game video according to an embodiment of the present disclosure.

DETAILED DESCRIPTION

Hereinafter, an exemplary embodiment of the present disclosure will be described in detail with reference to the accompanying drawing. The detailed description that will be disclosed below with the accompanying drawing is provided to describe an exemplary embodiment of the present disclosure, but is not intended to present only an embodiment in which the present disclosure can be practiced. The following detailed description includes the details to provide a thorough understanding of the present disclosure. However, those skilled in the art will understand that the present disclosure may be practiced without the detailed description. The certain terms as used herein are provided to help understanding of the present disclosure, and the use of the terms may be modified in any other form without departing from the technical spirit of the present disclosure.

FIGURE shows the architecture of a system for recognizing a player behavior and a game situation in a sport game video according to an embodiment of the present disclosure.

Referring to FIGURE, the system 10 for recognizing a player behavior and a game situation in a sports game video includes a video ingest module 100, an analysis module 110 and a service information providing module 120.

The system for recognizing a player behavior and a game situation in a sports game video according to embodiments may have aspects of entirely hardware, or partly hardware and partly software. For example, in the specification, the system for recognizing a player behavior and a game situation in a sport game video and each unit included in the system may refer collectively to a device for transmitting and receiving data of a specific format and content by an electronic communication method and its related software. The term "unit", "module", "server", "system", "device" or "terminal" as used herein is intended to refer to a combination of hardware and software that runs on the corresponding hardware. For example, the hardware may be a data processing device including a central processing unit (CPU) or any other processor. Additionally, the software that runs on the hardware may refer to a process being executed, an object, an executable, a thread of execution and a program.

Additionally, each unit of the system for recognizing a player behavior and a game situation in a sports game video is not necessarily intended to indicate a respective component that is physically different from each other. Although FIGURE shows the video ingest module 100, the analysis module 110 and the service information providing module 120 as respective blocks that are different from each other, this is merely the functional division of the components of the system for recognizing a player behavior and a game situation in a sports game video by the operations performed by the corresponding components. Accordingly, according to embodiments, some or all of the video ingest module 100, the analysis module 110 and the service information providing module 120 may be integrated into a same device, and may be implemented as respective devices, at least one of which is physically different from the other unit. Additionally, the video ingest module 100, the analysis module 110 and the service information providing module 120 may be the components connected to communicate with each other in a distributed computing environment, and may be configured to exchange data via a communication network.

The video ingest module 100 includes a video clip generation unit 101 to generate a video clip by extracting a game video every predetermined time. The game video may be a video of a sports game being played between a first team and a second team on a court. The video clip generation unit 101 may generate the video clip having the play time of 1 minute by extracting the game video every 1 minute. Additionally, in general, the sports game is recorded at various angles to deliver liveliness and vividness of the game and the broadcasting of the sports game is provided to users through the video. Accordingly, the game video may be a multi-view video including a plurality of game sub videos of the sports game recorded at a plurality of different angles. The video ingest module 100 may further include a multi-view video synchronization unit 102 to synchronize the plurality of game sub videos on the time axis. The video clip generation unit 101 may extract the video clip every predetermined time in each of the plurality of synchronized game sub videos.

The analysis module 110 may generate game situation information by analyzing the video clip through a trained analysis model, and the service information providing module 120 may generate game situation service information through the game situation information and provide the game situation service information to the user.

Specifically, the analysis module 110 includes a court analysis unit 111, an object analysis unit 112, a group analysis unit 113, a team analysis unit 114 and a game situation analysis unit 115.

The court analysis unit 111 generates court recognition information by recognizing a court area by analyzing the game video using semantic segmentation. The object analysis unit 112 generates object information by recognizing players and referees participating in the game in the recognized court area and equipment used in the game. The group analysis unit 113 generates group information by recognizing the behavior of a group by inputting the court recognition information and the object information to a first prediction model. The first prediction model may be pre-trained with a pre-annotated label by encoding the court recognition information and the object information and extracting a specific vector. The team analysis unit 114 generates team information by recognizing the first team and the second team based on the group information. The game situation analysis unit 115 generates game situation information by inputting the court recognition information, the object information, the team information and the group information to a second prediction model. The second prediction model may be pre-built by training with a game situation information label by encoding the court recognition information, the object information, the team information and the group information and extracting a specific vector.

The service information providing module 120 generates the game situation service information through the game situation information and provides the same to the user. The service information providing module 120 may include a plurality of units to generate each service information based on the game situation information. Specifically, the service information providing module 120 includes a record generation unit 121, a heatmap generation unit 122, a game statistics generation unit 123 and a game situation description generation unit 124.

The record generation unit 121 records events occurring in the game and generates in a suitable form for game broadcasting. The heatmap generation unit 122 generates a heatmap by accumulating the accumulated locations of the players and a ball possession situation. The game statistics generation unit 123 generates game statistics. The game situation description generation unit 124 may automatically generate situation information in a text form for use in game commentary based on the recognition of the game video.

As described above, the system for recognizing a player behavior and a game situation in a sport game video according to an embodiment of the present disclosure may generate service information by recognizing the complex game situation and the players' situations and provide the service information to various users who are needed to broadcast the game. Accordingly, it is possible to assist or replace the existing sports broadcasting, and reduce referee mistakes.

The system for recognizing a player behavior and a game situation in a sport game video according to an embodiment of the present disclosure can be used in various types of sports games.

While the present disclosure has been hereinabove described with reference to the embodiments, the present disclosure should not be interpreted as being limited to the embodiments and the accompanying drawing and it will be appreciated by those skilled in the art that various modifications and variations may be made to the present disclosure without departing from the technical spirit and scope of the present disclosure set forth in the appended claims.

What is claimed is:

1. A system for recognizing a player behavior and a game situation in a sports game video, comprising:

at least one processor; and a memory configured to store a program that is executed by the at least one processor, wherein the processor is configured to: generate a video clip by extracting a game video every predetermined time, generate a game situation information by analyzing the video clip through a trained analysis model, and generate a game situation service information through the game situation information and provide the game situation service information to a user, and wherein the game video is a video of a sport game being played between a first team and a second team on a court, wherein the processor is further configured to:

generate a court recognition information by recognizing a court area by analyzing the game video using semantic segmentation, generate an object information by recognizing players and referees participating in the game in the recognized court area and equipment used in the game, generate a group information by recognizing a behavior of a group by inputting the court recognition information and the object information to a first prediction model, generate a team information by recognizing the first team and the second team based on the group information, and generate the game situation information by inputting the court recognition information, the object information, the team information and the group information to a second prediction model, wherein the first prediction model is pre-trained with a pre-annotated label by encoding the court recognition information and the object information and extracting a specific vector, and wherein the second prediction model is pre-built by training with a game situation information label by encoding the court recognition information, the object information, the team information and the group information and extracting a specific vector.

2. The system for recognizing a player behavior and a game situation in a sports game video according to claim 1, wherein the game video is a multi-view video including a plurality of game sub videos of the sports game recorded at a plurality of different angles, and wherein the processor is further configured to:

synchronize the plurality of game sub videos on a time axis, and extract the video clip every predetermined time in each of the plurality of synchronized game sub videos.

3. The system for recognizing a player behavior and a game situation in a sports game video according to claim 1, wherein the processor is further configured to:

record events occurring in the game, and generate in a suitable form for game broadcasting, generate a heatmap by accumulating accumulated locations of the players and a ball possession situation, generate game statistics, and automatically generate situation information in a text form for use in game commentary based on the recognition of the game video.

* * * * *